(12) United States Patent
Faigenblat

(10) Patent No.: US 6,684,733 B2
(45) Date of Patent: Feb. 3, 2004

(54) STEERING WHEEL ACCENT STRIP

(75) Inventor: Yzhak Faigenblat, North Woodmere, NY (US)

(73) Assignee: B & I Fender Trims, Inc., Maspeth, NY (US)

( * ) Notice: Subject to any disclaimer, the term of this patent is extended or adjusted under 35 U.S.C. 154(b) by 0 days.

(21) Appl. No.: 09/854,126

(22) Filed: May 11, 2001

(65) Prior Publication Data

US 2002/0078647 A1 Jun. 27, 2002

Related U.S. Application Data

(60) Provisional application No. 60/258,422, filed on Dec. 27, 2000.

(51) Int. Cl.$^7$ .............................. B62D 1/06; G05G 1/10
(52) U.S. Cl. ......................................... 74/558; 74/558.5
(58) Field of Search ................................ 74/558, 558.5, 74/557, 552; 16/431, 435; 156/304.5; 428/57, 60

(56) References Cited

U.S. PATENT DOCUMENTS

| | | | | |
|---|---|---|---|---|
| 2,425,245 A | * | 8/1947 | Johnson ........................ | 16/422 |
| 3,726,152 A | * | 4/1973 | Tsuneizumi ................... | 74/552 |
| 4,788,759 A | * | 12/1988 | Yano et al. .................... | 29/611 |
| 5,207,713 A | * | 5/1993 | Park ............................. | 280/750 |
| 5,761,968 A | | 6/1998 | Poteet .......................... | 74/558 |
| 6,065,366 A | * | 5/2000 | Koyama et al. ............. | 156/293 |
| 6,138,526 A | * | 10/2000 | Mori ........................... | 428/151 |
| 6,145,410 A | * | 11/2000 | Ashkenazi ................... | 76/108.1 |
| 6,216,556 B1 | * | 4/2001 | Koyama et al. ............. | 156/293 |

FOREIGN PATENT DOCUMENTS

| | | | | |
|---|---|---|---|---|
| JP | 60061361 A | * | 4/1985 | ............ B62D/1/04 |

* cited by examiner

*Primary Examiner*—David A. Bucci
*Assistant Examiner*—Timothy McAnulty
(74) *Attorney, Agent, or Firm*—Gottlieb, Rackman & Reisman, P.C.

(57) ABSTRACT

A decorative strip for automotive bodies, and more particularly, for steering wheel rings, is formed of a thin vinyl substrate with an adhesive coating on one surface and a decorative design on the other. The surface with the decorative design is covered with a coat made of a clear resin. The strip has a generally arcuate shape so that it fits easily on the steering wheel ring thereby improving its esthetic look. Moreover the strip is elastic so that it can be bent as at is applied to the steering wheel thereby conforming naturally to its radius of curvature and forming a smooth and continuous cover without any ridges or other irregularities. In some instances the strip is formed of several parallel sections to allow the strip to adapt better to the curvature of the wheel ring. The sections may have linear lateral edges or the edges may be serrated to form interlocking profiles as the sections are abutted against each other.

14 Claims, 4 Drawing Sheets

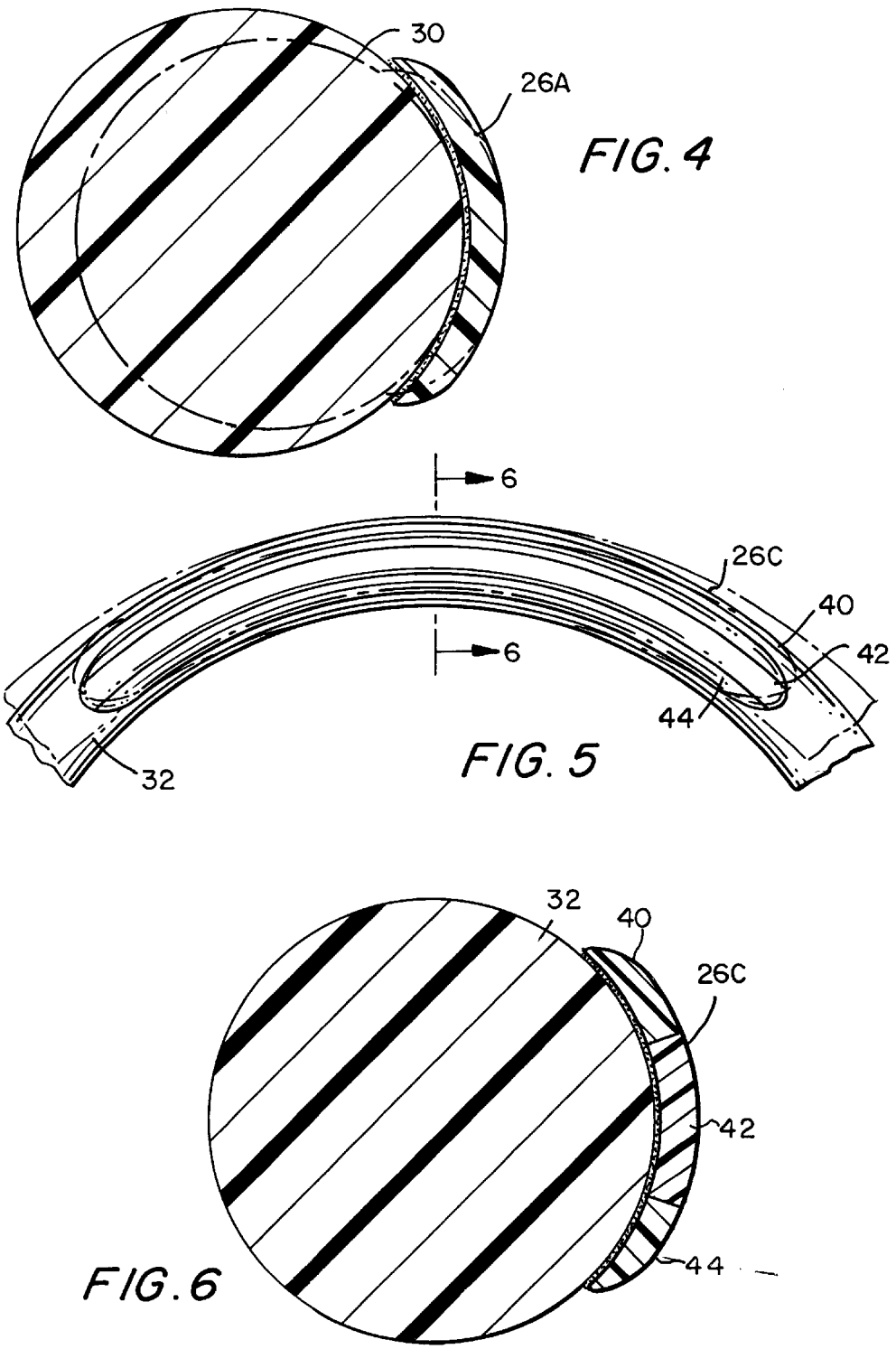

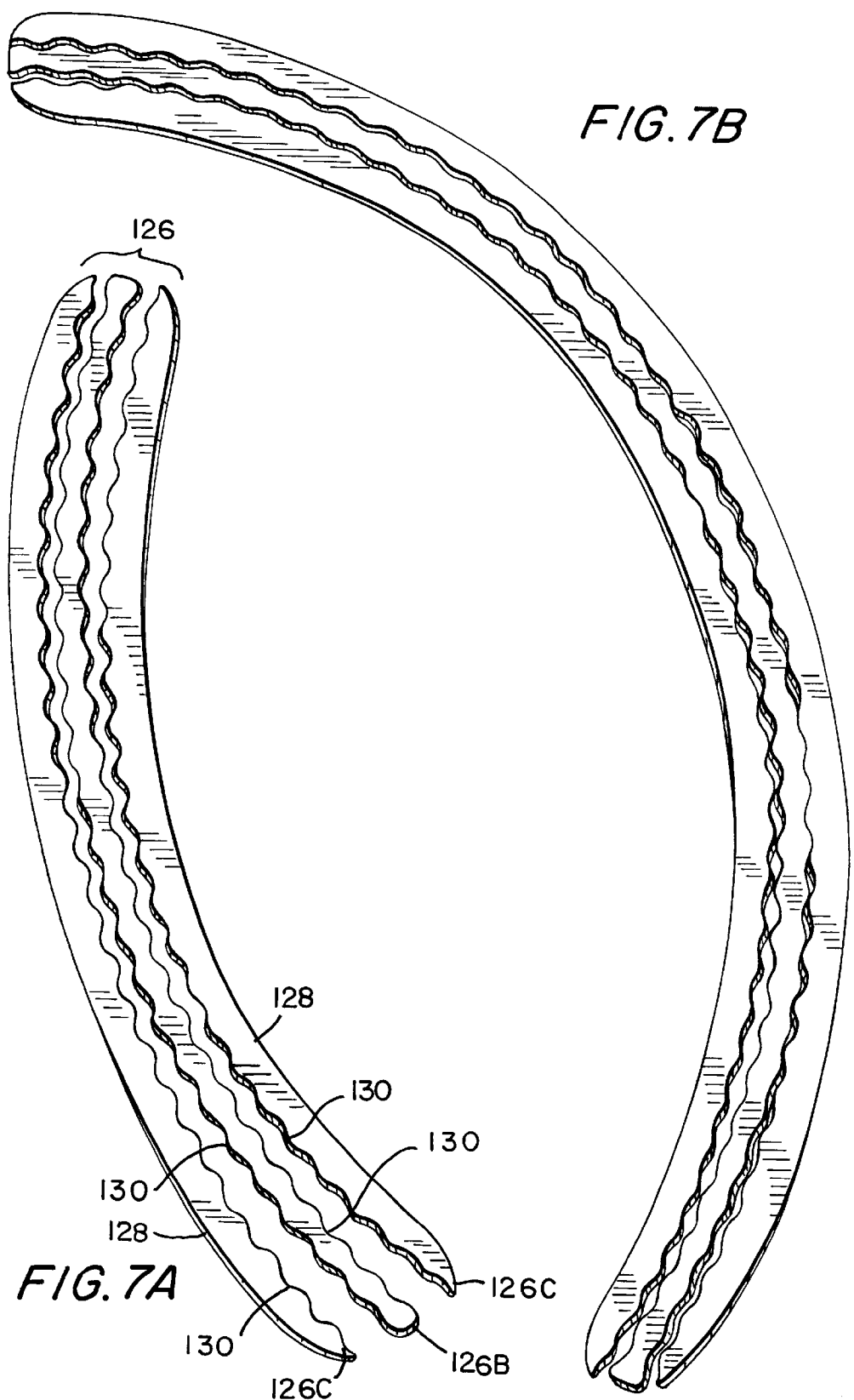

STEERING WHEEL ACCENT STRIP

RELATED APPLICATIONS

This application claims priority to provisional application Ser. No. 60/258,422 filed Dec. 27, 2000.

BACKGROUND OF THE INVENTION

A. Field of Invention

This invention pertains to accent strips for automotive bodies and the like, and more particularly to accent strips designed for the steering wheel of a car.

B. Description of the Prior Art

Many consumers who purchase moderately priced automobiles would like to be able to enhance the look of the automobile's steering wheel so that it has the appearance found in many luxury cars. For example, Mercedes Benz, Audi and BMW market automobiles in which certain elements, such as the steering wheel, combine real or plastic wood veneer is used as a decorative material. Car manufacturers often use carbon fiber and other highly decorative materials to enhance the appearance of the interiors of motor vehicles, especially in high-end or expensive vehicles such as sports cars.

However, the interiors of average vehicles and low-end or inexpensive vehicles are frequently only scantily decorated and the owner of these vehicles must rely on after-market decoration products to enhance the appearance of the vehicle interior. The number of such aftermarket products are very limited, especially for the steering wheel.

One solution available to a motor vehicle owner is to change an entire part or section of the vehicle with one that has a more decorative look. However, in some cases, such a change is impractical and too expensive. For example, all modern passenger motor vehicle are provided with an air bag incorporated into a steering wheel. Typically, an aftermarket steering wheel can be made with an enhanced aesthetic appearance as compared to the original steering wheel. However, once the steering wheel is equipped with an air bag, the cost of the steering wheel becomes prohibitive. Moreover, changing such as steering wheel is difficult, and may have a negative impact on the warranty. Thus, replacing a standard, installed steering wheel with an aftermarket steering wheel is oftentimes an impractical option.

U.S. Pat. No. 5,761,968 to Grant, et al. is a significant improvement to previous options. The Grant design allows the user to install, without much difficulty, a look-enhancing steering ring on the upper or top portion of the wheel ring. However, the Grant design is less than desirable. The Grant steering wheel ring leaves a ridge that may be uncomfortable for some consumers when operating the steering wheel. In addition, the rigid material of the Grant steering wheel ring design creates significant installation difficulties and also has certain shortcomings with regard to fit. Further, the Grant steering wheel ring is model-specific and is not available for all steering wheel shapes and sizes.

OBJECTIVES AND SUMMARY OF THE INVENTION

The inventive design provides a self-sticking strip or combination of self-sticking decorative strips which usually have a decorative design and are covered by a clear coat having a domed cross-section, Each Strip is sufficiently flexible so that it can conform to a variety of steering wheel shapes, diameters and thicknesses.

Preferably each decorative strip is formed as follows. First, a substrate is cut out from a sheet of vinyl having the desired thickness. On one surface the sheet has been imprinted with a decorative design. The other surface of the substrate is covered with an adhesive material. The substrate and the adhesive material may each have a thickness in the range of 0.003–0.007 inches. The substrate is cut so that generally has an arcuate shape to conform to the curvature of steering wheel rings. Excess material is discarded using a weeding process.

Next, the substrate is disposed on a support. The support may be release sheet from which the final decorative strips can be separated and then mounted on a steering wheel as desired.

A doming process is the used to form a coat on top of the substrate thereby forming the decorative strips. The coat is a special non-uniform layer which is thicker at the center of the substrates then at the longitudinal edges. For this purpose a transparent resin is formed of two compounds, which resin is a thick liquid initially so that it can be poured over the substrates and room temperature, using a funnel or a nozzle. After the resin is poured over each substrate, the resin slowly flows laterally across the substrate surface until it reaches the substrate edges. The amount of resin poured or deposited over the substrate is carefully metered to insure that it does not flow over the edges. After the resin spreads laterally, it is cured, preferably at room temperature so that it forms a substantially hard coat over the substrate.

For a wheel having a ring with a large cross-sectional diameter, or if the strip is relatively narrow, a single strip may be sufficient. For broader strips, or wheel rings with larger cross-sectional diameters, several parallel strips may be necessary. The strips may have linear lateral edges, or may be interlocking profiles to ease the assembly and to insure that the strips fit better together.

BRIEF DESCRIPTION OF THE DRAWINGS

FIG. 4 shows a cross sectional view of the ring of FIGS. 2 and 3 with the attached strip;

FIG. 5 shows a plan view of another embodiment of the strip attached to a steering wheel ring;

FIG. 6 shows a cross sectional view of the ring of FIG. 5 with the attached strip.

FIG. 7A shows a plan view of another embodiment of the invention; and

FIG. 7B shows a plan view of the strip sections of the embodiment of FIG. 7A being fit together.

DETAILED DESCRIPTION OF THE INVENTION

In a preferred embodiment, the inventive design strip comprises a substrate made of a vinyl material having a thickness of between about 0.003 and 0.007 inches that is printed with a desirable decorative image on at least one surface using conventional silkscreen technology. An adhesive is laminated or applied using other techniques to the second surface of the substrate. The adhesive may have a thickness of between about 0.003 and 0.007 inches. The vinyl substrate is then cut into half moon or other desired shaped pieces, typically by means of a computerized vinyl plotter. Excess vinyl substrate is then removed by means of a conventional "weeding" process.

Figure 1A:
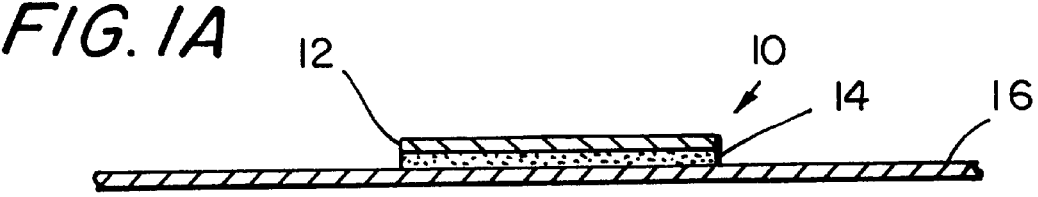
FIG. 1A shows a cross sectional view of a substrate of vinyl material covered on one side with an adhesive and disposed or affixed on a support sheet.

FIG. 1A shows a laminate 10 having a predetermined shape and being formed of the substrate 12 and the adhesive 14. The laminate 10 is disposed on a support 16. For example, the support may be a release sheet constructed to hold the laminate 10 securely but allow it to be peeled off as required.

After the laminate 10 is positioned on the support 16, it then undergoes a process known as doming. Doming comprises the pouring on top of the substrate 12 a clear and relatively thick and viscous bead, which is allowed to flow to the edges of the substrate, creating a coat. More specifically, the coat has a much greater cross sectional dimension at the middle of the laminate than its lateral edges.

Preferably, the bead used in the doming process is a polyurethane resin having a flexibility of between about 50 shore D and 70 shore D. Alternatively, a polyurethane resin, an epoxy or other similar coating type material may be used.

Figure 1B:
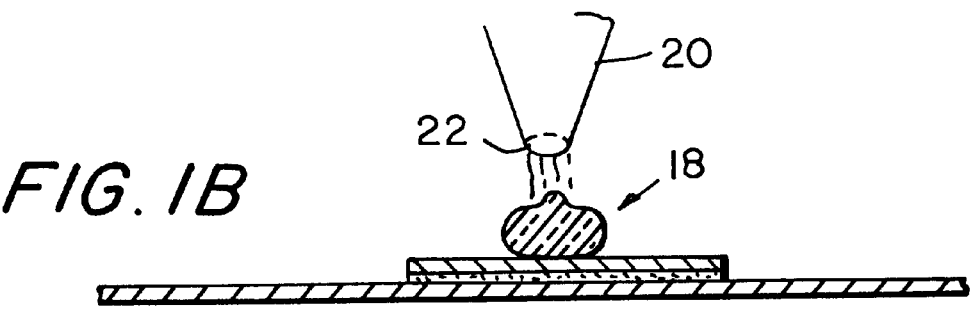
FIG. 1B shows a cross sectional view of the substrate with a bead of plastic material.

FIG. 1B shows a bead 16 after it has been deposited on top of the substrate 12. In order to achieve the best results in the doming step, the polyurethane resin or other material is poured through a funnel 20 having a small opening 22 in order to enable selective control of the size of the bead applied to the substrate 12 so that it flows laterally along the surface of the substrate and then stops at the substrate edges. If an excessive amount of the coating material forming the bead 18 is poured onto the substrate 12, then the resulting product will not be useable because will sp;ill over the laminate 10 and on the support 16.

Figure 1C:
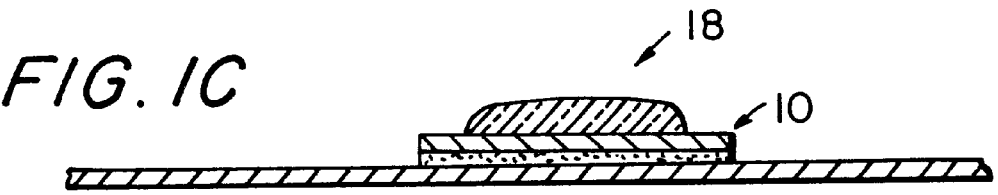
FIG. 1C shows a cross sectional view of the substrate with the bead starting to spread laterally.
Figure 1D:
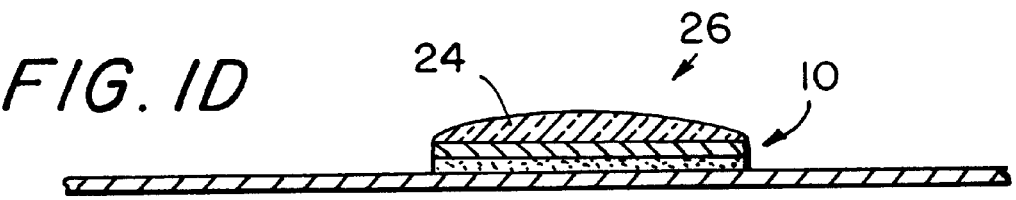
FIG. 1D shows a cross sectional view of the resulting decorative strip.

This process is illustrated by FIGS. 1B–1D. In FIG. 1B, the bead 18 has been applied to or deposited on the top surface of substrate 12 and is starting to spread laterally. FIG. 1C shows an intermediate stage in which the bead 18 is still spreading. FIG. 1D shows how the bead 18 stops at the lateral edges of the laminate 12. The doming process may take from 10 to 90 minutes.

The bead is now allowed to cure at a temperature of between about 70° F. and 100° F. and for a time period of between 12 and 24 hours. Once curing is completed, bead 18 forms a hard coat 24 having a curved top surface. The decorative strip 26 formed of the laminate 10 and the coat 24 is now finished and ready to be applied. In FIGS. 1A–1D the thickness of the substrate 12, adhesive 14 are exaggerated as compared to the thickness of the bead 18 and coat 24. The decorative strip 26 can have a maximum cross-section of 1/8 or even 3/16 inches.

In one example, the polyurethane resin which is poured over or otherwise applied to the substrate 12 as part of the doming process. The resin comprises a mixture of first component A and second component B wherein component A consists of an aliphatic isocyanate and polyether polyol which are used to form an isocyanate terminated prepolymer. Component B consists of polyether polyols as well as a catalyst. Components A and B are mixed together before being applied to form bead 18.

In general, the polyurethane resin which is used in preparing the inventive self-sticking adhesive strip has a viscosity of between 1,000 and 4,000 cps. and a hardness when cured of between 70 shore A and 60 shore D. Moreover, the polyurethane resin has an elongation greater than 50%

Figure 2:
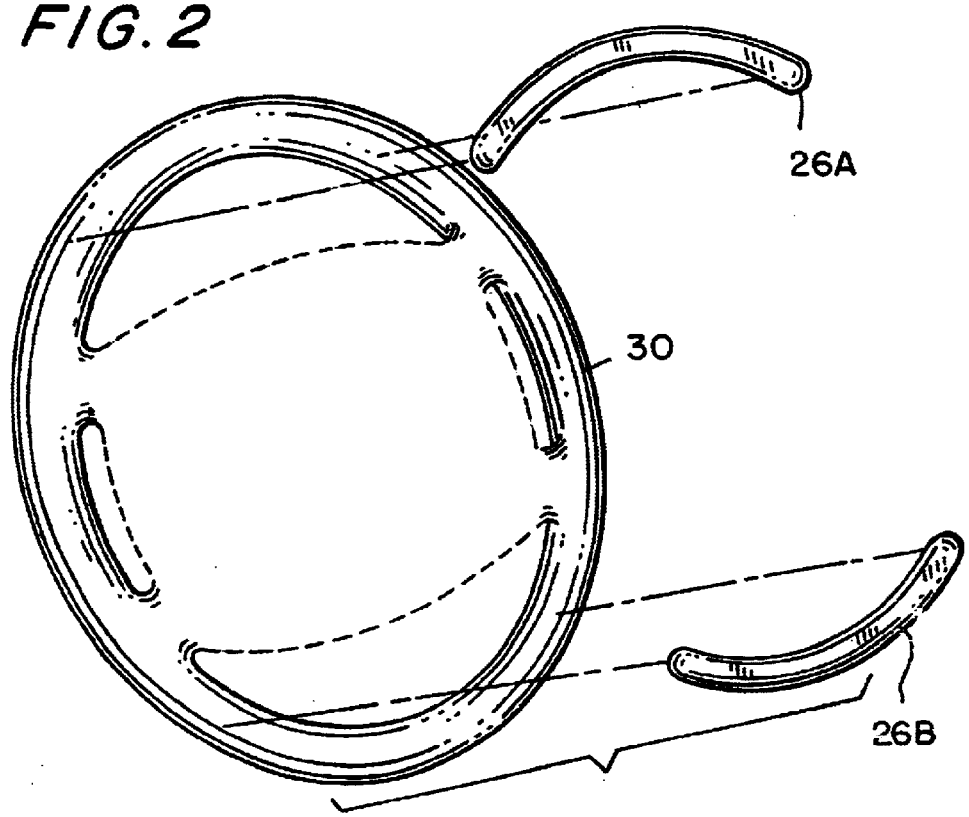
FIG. 2 shows an orthogonal view of two decorative strips being installed on the ring of a steering wheel.

The remaining Figures show decorative strips 26 being applied to a steering wheel ring. FIG. 2 is an exploded view of a steering wheel ring 30 and a pair of decorative steering wheel gripe 26A. Strips 26A are half moon or C-shaped to conform to the curvature of the steering wheel ring 30 and are made in accordance with the invention as described above. Before being applied to the ring 30, the strips 26A, 26B are stripped from the support 16.

Figure 3:
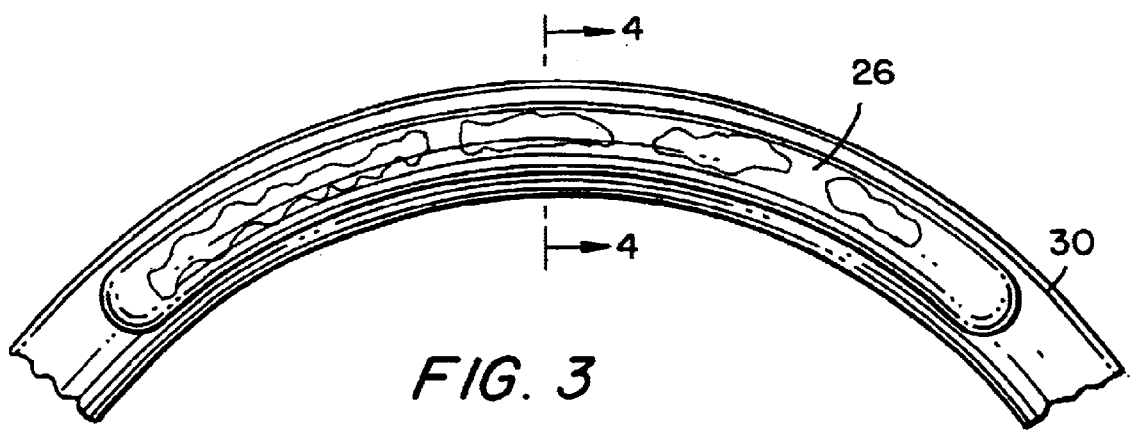
FIG. 3 shows a partial plan view of the ring of FIG. 2 with the decorative strip attached.

FIG. 3 is an enlarged plan view showing the application or placement of decorative steering wheel strip 26A on an arcuate portion of steering wheel ring 30. FIG. 4 is a cross-sectional view taken along line 4—4 of FIG. 3. As can be seen in this Figure, after its application, the decorative strip 26A takes on a curved cross sectional shape to follow the shape of the steering wheel ring 30.

FIG. 5 and is similar to FIG. 3, but shows an alternate embodiment of the invention. More particularly, in FIG. 5 a decorative steering wheel strip 26C is shown which is composed of several parallel sections 40, 42, 44 having lateral edges which are substantially linear and arranged to fit together side-by-side. This embodiment is suitable for a steering wheel ring 32 which has a generally larger diameter. FIG. 6 shows a cross sectional view of a steering wheel ring 32 with the multisection strip 26C disposed thereon.

FIG. 7A shows another embodiment of the invention wherein a multisection decorative strip 126 formed of three parallel sections 126A, 126B and 126C. The two end sections 126A, 126C have a linear lateral edge 128 on one side and a serrated lateral edge 10 on the other side. The center strip 126B has serrated lateral edges 130 on both sides. The sections 126A, 126B, 126C are made separately using the process described above so that each section includes a coat that is thick at the center and is then thins out gradually toward the lateral edges.

The serrated edges 130 define interlocking profiles which are complementary so that the three sections can be mounted adjacent to each other on a steering wheel ring in an abutting relationship as shown in FIG. 7B. The serrated edges assist in the proper alignment of the strip sections during installation and insure that the sections do not creep longitudinally after installation. Moreover, because the strip 126 is formed of several sections, it can be mounted easily on a wheel rim having a smaller cross-sectional diameter without any danger of separation. Finally, each serrated edge is very thin, and the resulting strip 126 is formed with dimples defined by adjacent serrations of the lateral strips giving it a pleasing dimpled effect.

The transparent coat is advantageous because it gives the decorative strips an attractive look. This effect is further enhanced by the fact that the coat is shaped like a lens and therefore optically magnifies the design on the substrate, thereby giving the whole decorative strip an apparent thickness and depth that is larger than its real crone sectional dimension.

As can be appreciated, the inventive design provides a universal application of highly decorative material strips for enhancing the look of a steering wheel ring. In other words, the same strips may be used for cars having steering wheels with rings of different diameters since they are flexible and can adapt naturally to the outer surface of rings independently of their diameters. The inventive steering wheel strips are easy and safe to install by the ordinary consumer and provide a seamless application to the contours of any steering wheel ring regardless of the ring's diameter or thickness. Further, the inventive steering wheel strips provide appropriate fit and bonding each time they are used without the formation of unsightly ridges. Moreover, the strips can be made quickly and inexpensively using computer-control automated equipment.

Numerous modifications may be made to this invention without departing from its scope as defined in the appended claims.

I claim:

1. A steering wheel decorative strip comprising:

a plurality of sections, each section including a laminate formed of a substrate and a first and a second surface with an adhesive attached to said first surface and a coat made of a flexible material on said second surface, said coat having a curved cross-section so that it is considerably thicker along the center of the laminate then along its edges, said laminate being flexible and being sized and shaped to fit on the ring of a steering wheel, and a support sheet, said laminate being removably attached to said support sheet by said adhesive, said sections having longitudinal edges conforming to each other to interlock and form a unitary strip that is sized and shaped to fit on the ring of a steering wheel, said unitary strip being removably mounted on a support sheet by said adhesive for a consequent selective placement on said steering wheel.

2. The strip of claim 1 wherein said polyurethane resin has a hardness between 70 shore D and 60 shore A.

3. The strip of claim 1 wherein said substrate is made of vinyl.

4. The strip of claim 1 wherein said coat is made of polyurethane.

5. The strip of claim 1 wherein said coat is made of a material having a hardness between 60 and 70 shore.

6. The strip of claim 1 wherein coat is formed of a plurality of adjacent longitudinal segments.

7. A decorative strip for a releaseable mounting on a vehicular steering wheel, said strip comprising:

a plurality of sections, each section including a laminate formed of a substrate and a first and a second surface with an adhesive attached to said first surface and a coat made of a flexible material on said second surface, said laminate being flexible;

wherein said sections have longitudinal edges conforming to each other to interlock and form a unitary strip that is sized and shaped to fit on the ring of a steering wheel, said unitary strip being removably mounted on a support sheet by said adhesive for a consequent selective placement on said steering wheel.

8. The strip of claim 7 wherein each said section includes at least one lateral edge having a serrated profile, said sections fitting together in an abutting relationship along said lateral edges.

9. The strip of claim 8 wherein two sections each include a linear lateral edge on one side and said serrated lateral edge on the other side.

10. The strip of claim 8 wherein said sections having complementary profiles.

11. The strip of claim 8 wherein said substrate has a decorative image and said coat is made from a transparent material, with said decorative image being visible through said coat.

12. A steering wheel decorative strip comprising:

a laminate formed of a substrate with a first and a second surface with an adhesive attached to said first surface and a decorative image on said second surface, said laminate further including a coat made of a flexible transparent material attached to said second surface, said coat having a curved cross-section so that it is considerably thicker along the center of the laminate then along its edges, with said image being visible through said coat, said laminate being flexible and being sized and shaped to fit on the ring of a steering wheel, wherein said strip further includes a plurality of sections, said sections having longitudinal edges conforming to each other to interlock and form a unitary strip that is sized and shaped to fit on the ring of a steering wheel.

13. A decorative strip for a releaseable attachment to any vehicle steering wheel comprising:

a substrate having an elongated shape and a decorative image on at least one side;

a transparent coat, and a support sheet, said transparent coat being made of a flexible material and attached to completely covering said substrate as to form a flexible assembly therewith, said flexible assembly being removably mounted on said support sheet for consequent selective placement on said steering wheel wherein said strip further includes a plurality of sections, said sections having longitudinal edges conforming to each other to interlock and form a unitary strip that is sized and shaped to fit on the ring of a steering wheel.

14. A decorative strip according to claim 13, wherein said strip has a curved shape selected to congruently fit on said steering wheel.

* * * * *